(12) United States Patent
Matsui

(10) Patent No.: US 11,100,655 B2
(45) Date of Patent: Aug. 24, 2021

(54) IMAGE PROCESSING APPARATUS AND IMAGE PROCESSING METHOD FOR HIDING A SPECIFIC OBJECT IN A CAPTURED IMAGE

(71) Applicant: CANON KABUSHIKI KAISHA, Tokyo (JP)

(72) Inventor: Taichi Matsui, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 101 days.

(21) Appl. No.: 16/260,806

(22) Filed: Jan. 29, 2019

(65) Prior Publication Data

US 2019/0236791 A1 Aug. 1, 2019

(30) Foreign Application Priority Data

Jan. 30, 2018 (JP) .............................. JP2018-014188

(51) Int. Cl.
*G06T 7/00* (2017.01)
*G06T 7/254* (2017.01)
(Continued)

(52) U.S. Cl.
CPC .............. *G06T 7/254* (2017.01); *G06T 7/194* (2017.01); *G06T 7/215* (2017.01);
(Continued)

(58) Field of Classification Search
CPC .................. G06T 7/194; G06T 7/254; G06T 2207/30196; G06T 2207/30232;
(Continued)

(56) References Cited

U.S. PATENT DOCUMENTS

2007/0237422 A1 10/2007 Zhou
2011/0038535 A1* 2/2011 Wang ..................... G06T 7/194
382/164
(Continued)

FOREIGN PATENT DOCUMENTS

CN 101777180 A 7/2010
CN 102074016 A 5/2011
(Continued)

OTHER PUBLICATIONS

Yasumoto Kawanishi; Background image generation by preserving lighting condition of outdoor scenes; Procedia Social and Behavioral Science vol. 2, pp. 129-136.

*Primary Examiner* — Li Liu
(74) *Attorney, Agent, or Firm* — Canon U.S.A., Inc. IP Division

(57) ABSTRACT

An image processing apparatus includes a detection unit configured to detect a first region in which a foreground object is present with respect to a plurality of captured images, a retention unit configured to retain a first background image, a generation unit configured to generate a second background image based on portions of each of the plurality of captured images which are not detected as a first region, and an output unit configured to select one of the first background image and the second background image based on a property of the second background image, and configured to output, based on the selected background image and the first region, an image in which the foreground object is obscured.

12 Claims, 5 Drawing Sheets

(51) Int. Cl.
  *G06T 7/215* (2017.01)
  *H04N 5/272* (2006.01)
  *H04N 5/232* (2006.01)
  *G08B 13/196* (2006.01)
  *G06T 7/194* (2017.01)

(52) U.S. Cl.
  CPC ... *G08B 13/19686* (2013.01); *H04N 5/23219* (2013.01); *H04N 5/272* (2013.01)

(58) Field of Classification Search
  CPC ........... G06T 7/215; G06T 2207/10016; G06T 2207/20221; G08B 13/19686; G08B 13/19604; G06K 2209/21
  See application file for complete search history.

(56) References Cited

U.S. PATENT DOCUMENTS

| | | | |
|---|---|---|---|
| 2012/0106849 A1 | 5/2012 | Tojo | |
| 2012/0191353 A1 | 7/2012 | Wilt et al. | |
| 2013/0011049 A1* | 1/2013 | Kimura | G06T 7/194 382/155 |
| 2016/0026875 A1* | 1/2016 | Matsumoto | G06K 9/00771 348/143 |
| 2016/0171332 A1* | 6/2016 | Kawano | G06K 9/00771 382/173 |
| 2018/0122117 A1* | 5/2018 | Kawano | G06T 1/0007 |
| 2018/0255326 A1* | 9/2018 | Oya | H04N 7/188 |
| 2018/0359449 A1* | 12/2018 | Matsumoto | G06T 7/254 |
| 2019/0147601 A1* | 5/2019 | Kakuko | G06T 7/74 382/103 |
| 2019/0208139 A1* | 7/2019 | Kawai | G06T 7/13 |
| 2019/0222718 A1* | 7/2019 | Sawai | H04N 1/4493 |

FOREIGN PATENT DOCUMENTS

| | | |
|---|---|---|
| CN | 102387303 A | 3/2012 |
| CN | 103098093 A | 5/2013 |
| CN | 103533249 A | 1/2014 |
| CN | 103813088 A | 5/2014 |
| CN | 105205833 A | 12/2015 |
| CN | 105701756 A | 6/2016 |
| EP | 2555162 A1 | 2/2013 |
| EP | 3043329 A2 | 7/2016 |
| JP | 2016115214 A | 6/2016 |
| KR | 10-1290197 B1 | 7/2013 |

\* cited by examiner

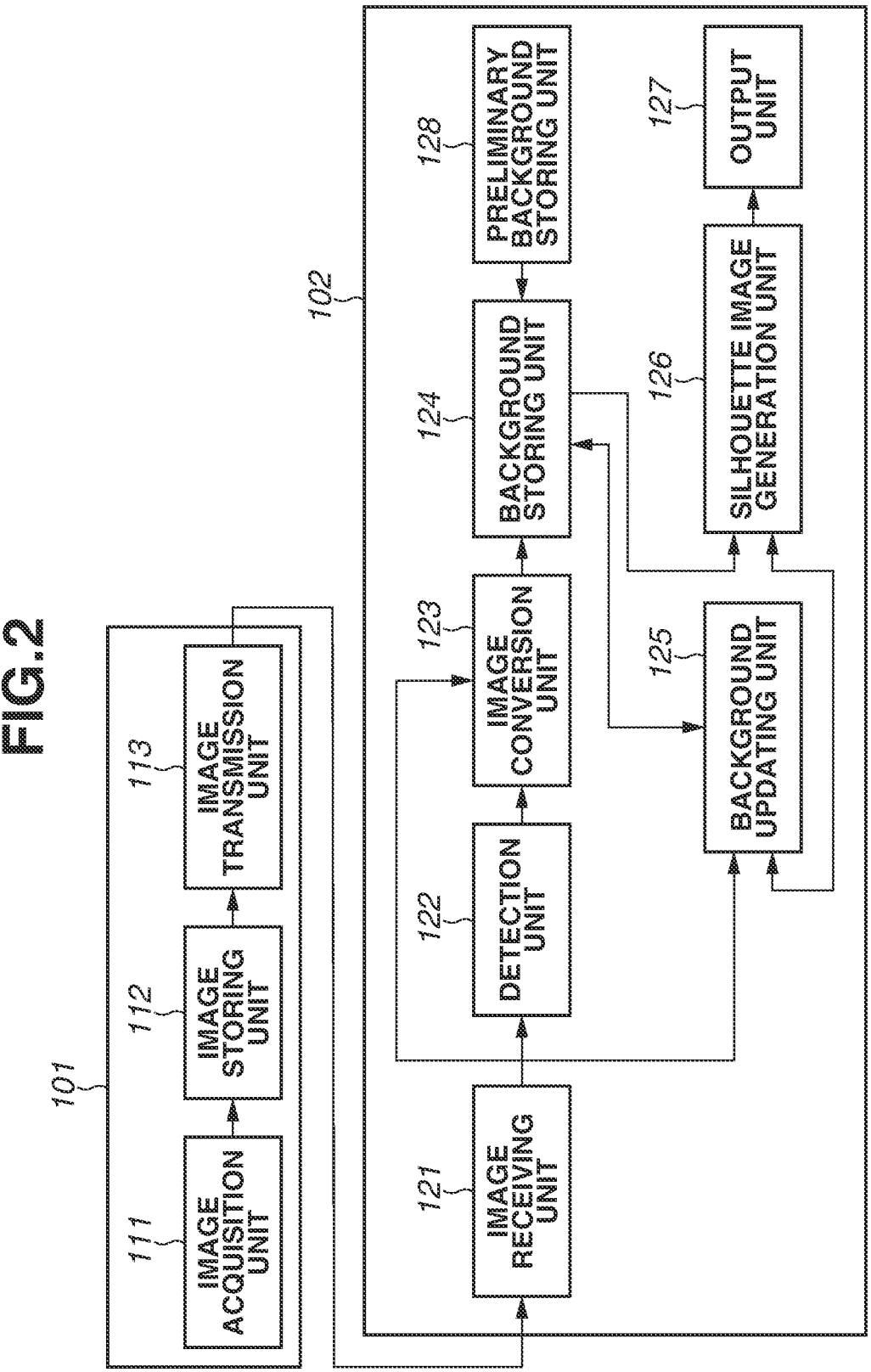

IMAGE PROCESSING APPARATUS AND IMAGE PROCESSING METHOD FOR HIDING A SPECIFIC OBJECT IN A CAPTURED IMAGE

BACKGROUND OF THE INVENTION

Field of the Invention

Aspects of the present invention generally relate to an image processing apparatus, an image processing method, and a storage medium each of which hides a specific object, such as a person, from a captured image so as to protect privacy.

Description of the Related Art

In recent years, the importance of privacy protection for an individual whose image is captured by a monitoring camera has been increasing. Therefore, there is a technique to use a background image so as to detect a region in which to protect privacy. For example, there is a method of previously acquiring, as a background image, an image captured at timing when no foreground is shown in the image, comparing a processing target image with the background image, and performing concealment processing on a specific region of the processing target image based on a result of comparison, thus protecting privacy. A technique discussed in Japanese Patent Application Laid-Open No. 2016-115214 detects a human body or moving object included in a captured image and performs processing in such a way as to update a background image based on the detection thereof, thus increasing the accuracy of concealment processing.

In the technique of acquiring, as a background image, an image captured at timing when no foreground is shown in the image and using the background image in a fixed manner, if, for example, a large change occurs in the luminance of an image capturing environment, a comparison with the background image may sometimes cause a region to be excessively extracted as a foreground. On the other hand, in the technique discussed in Japanese Patent Application Laid-Open No. 2016-115214, while regions other than human body or moving object regions included in an image capturing range are combined to successively update a background image, depending on an environment in which image capturing is performed, a region which is always determined to be a moving object region occurs, so that the background image may enter a hole-like defective state. Here, a hole-like defective state is a state where the moving object region is removed from the background image. It may be unfavorable to use such a hole-like defective image as a background image for foreground extraction processing or privacy protection processing.

SUMMARY OF THE INVENTION

According to an aspect of the present invention, an image processing apparatus includes a detection unit configured to detect a first region in which a foreground object is present with respect to a plurality of captured images, a retention unit configured to retain a first background image, a generation unit configured to generate a second background image based on portions of each of the plurality of captured images which are not detected as a first region, and an output unit configured to select one of the first background image and the second background image based on a property of the second background image, and configured to output, based on the selected background image and the first region, an image in which the foreground object is obscured.

Further features of the present invention will become apparent from the following description of exemplary embodiments with reference to the attached drawings.

BRIEF DESCRIPTION OF THE DRAWINGS

FIG. 2 is a block diagram illustrating a functional configuration of each apparatus.

DESCRIPTION OF THE EMBODIMENTS

Various exemplary embodiments, features, and aspects of the invention will be described in detail below with reference to the drawings.

<System Configuration>

Figure 1A:
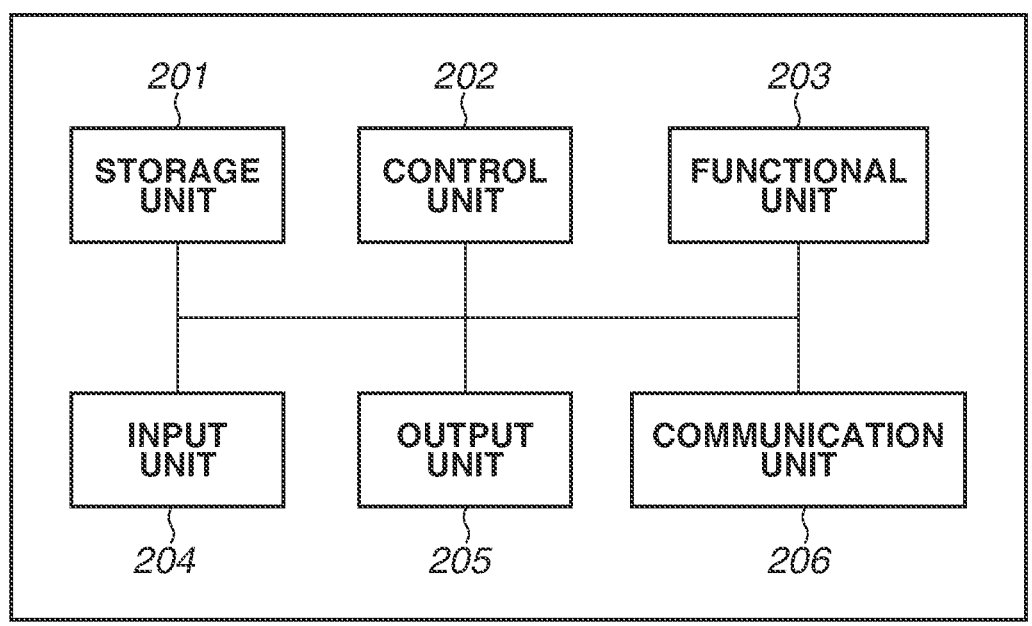
FIG. 1A is a block diagram illustrating a hardware configuration of each apparatus of an image processing system.
Figure 1B:
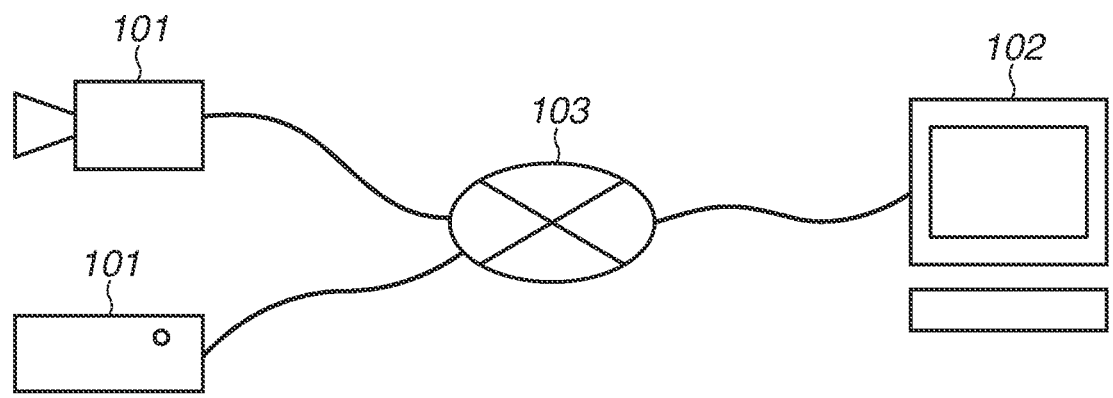
FIG. 1B is a block diagram illustrating a schematic configuration of the image processing system.

The block diagram of FIG. 1B illustrates a configuration example of an image processing system according to an exemplary embodiment of the present invention. The image processing system includes, for example, an imaging apparatus (image recording apparatus) 101 and a display apparatus 102, which are interconnected via a network 103 in such a way as to be able to communicate with each other. Furthermore, for example, the image processing system only needs to include a single image processing apparatus having the functions of the image recording apparatus 101 and the display apparatus 102 or can include three or more apparatuses which respectively have parts of the function of the image recording apparatus 101 or the display apparatus 102.

Each of the imaging apparatus (image recording apparatus) 101 and the display apparatus 102 includes, for example, a hardware configuration such as that illustrated in FIG. 1A. Furthermore, each apparatus can include a configuration other than the illustrated hardware configuration, or does not need to include a part of the illustrated hardware configuration. Moreover, in the following description, a system including the imaging apparatus 101 is mainly described.

Each apparatus includes, for example, a storage unit 201, a control unit 202, a functional unit 203, an input unit 204, an output unit 205, and a communication unit 206. The storage unit 201, which is configured with both of a read-only memory (ROM) and a random access memory (RAM) or any one of them, stores various pieces of information, such as programs for performing various operations described below and parameters used for communications and various processing operations. Furthermore, as the storage unit 201, in addition to memories such as a ROM and a RAM, a removable storage medium such as a flash memory, a hard disk drive (HDD), a solid-state drive (SSD), or an optical disc can be used.

Moreover, the control unit 202 controls the functional unit 203 to perform predetermined processing operations such as image capturing. The functional unit 203 is hardware used for each apparatus to perform predetermined processing operations. For example, in the case of the imaging apparatus 101, the functional unit 203 is an imaging unit, which performs image capturing processing. Moreover, for example, in a case where the display apparatus 102 has a printing function, the functional unit 203 is a printing unit which prints image data on, for example, a paper medium, and, in a case where the display apparatus 102 has a projector function, the functional unit 203 is a projection unit which projects content of image data. Data to be processed by the functional unit 203 can be data stored in the storage unit 201 or can be data acquired by communicating with another apparatus via the communication unit 206 described below.

The input unit 204 is an interface which performs reception of various operations from the user, and, in the case of the display apparatus 102, the input unit 204 is, for example, a mouse, a keyboard, or a touch panel display. The output unit 205 performs various output operations to the user. Here, the output operations to be performed by the output unit 205 include, for example, an output operation for displaying on a display screen, a sound output operation performed by a loudspeaker, and a warning output operation to an external device such as a warning lamp. Furthermore, a combination of the input unit 204 and the output unit 205 can be implemented by a single module configured as a touch panel.

The communication unit 206 performs, for example, control of wired communication (or wireless communication) and control of communication compliant with the Internet Protocol (IP). Each apparatus communicates content, such as image data, document data, and video data, with another apparatus via the communication unit 206. For example, communications between the image recording apparatus 101 and the display apparatus 102 are performed via the communication units 206 of the respective apparatuses.

FIG. 2 is a block diagram illustrating a functional configuration of each apparatus of the image processing system. As illustrated in FIG. 2, the imaging apparatus 101 includes an image acquisition unit 111, an image storing unit 112, and an image transmission unit 113. The image acquisition unit 111, which is implemented by the control unit 202 executing a program stored in the storage unit 201 to control the functional unit (imaging unit) 203, acquires images at predetermined intervals with use of the imaging unit (functional unit 203) including a lens and a sensor and then supplies the acquired images to the image storing unit 112.

The image storing unit 112, which is implemented by, for example, the storage unit 201, stores an image acquired from the image acquisition unit 111. Thus, the image storing unit 112 retains an image captured by the imaging unit 203. The image transmission unit 113, which is implemented by the communication unit 206, acquires, in response to an acquisition request for an image being received from the display apparatus 102, the requested image from among images stored in the image storing unit 112 and transmits the acquired image to the display apparatus 102. Furthermore, the acquisition request, which is received from the display apparatus 102, is, for example, a signal including information specifying an image capturing time of day, and the image transmission unit 113 is able to determine an image which is to be transmitted to the display apparatus 102, based on information about the specified image capturing time of day. The acquisition request, which is received from the display apparatus 102, can be a simple request to deliver an image acquired by the imaging apparatus 101.

On the other hand, the display apparatus 102 includes, as a functional configuration thereof, an image receiving unit 121, a detection unit 122, an image conversion unit 123, a background storing unit 124, a background updating unit 125, a silhouette image generation unit 126, an output unit 127, and a preliminary background storing unit 128.

The image receiving unit 121, which is implemented by, for example, the communication unit 206, transmits an acquisition request for an image to the imaging apparatus 101, receives and acquires an image from the imaging apparatus 101 as a response to the acquisition request, and supplies the acquired image to the detection unit 122, the image conversion unit 123, and the background updating unit 125. In the following description, an image acquired from the imaging apparatus 101 is referred to as an "acquired image".

The detection unit 122, which is implemented by, for example, the control unit 202 executing a program stored in the storage unit 201, detects a region of a person (human body) shown in the acquired image. Such detection of a region of a person is performed with use of, for example, a pattern matching method. The detection unit 122 generates information indicating whether a person is shown in the acquired image and, in a case where one or more persons are shown in the acquired image, generates information about the coordinates of a region on the acquired image in which each of the persons is shown. In the following description, the thus-generated information is referred to as a "detection result". Furthermore, here, the coordinates of a region are assumed to be coordinates of a rectangular region including a region in which a person is shown, but can be, for example, coordinates for specifying a region surrounded by a curved line extending along the shape of the person. Moreover, the region in which a person is shown may be a region in which the face and body of the person are shown, but can be a region in which, for example, only the face of the person is included. In the following description, the region in which a person is shown is referred to as a "person region". Furthermore, the human body can be the entire body, can be the upper body (torso) including the trunk, head, and arms, or can be a part of the body. In the case of performing pattern matching, the detection unit 122 uses features corresponding to parts of a detection object as a dictionary and scans an image of the detection object to extract a matched region.

Furthermore, the detection unit 122 is able to extract a region of a given foreground object from the acquired image by, for example, performing moving object detection processing using a background difference method or performing specific object detection processing. For example, the detection unit 122 can determine the attribute of an object region, such as a person or a car, (for example, sex, age, color feature, and body height in the case of a person, and color feature, dimensions, and height in the case of a car), and can treat only a region of an object which has a predetermined attribute and is not a background object, such as a person, as a detection result.

Moreover, the detection unit 122 can use motion information between frames used for moving image coding as information indicating the presence or absence of an object. Moreover, generation of a detection result can be performed at the time of generation of a background image, but this is not a restriction. For example, in the image recording apparatus 101, detection processing such as that described above can be performed when an image is stored in the image storing unit 112 or when the image acquisition unit 111 has acquired the captured image. Furthermore, the detection unit 122 can be configured to store, in the storage unit 201, the detection result as metadata in association with the image. Moreover, the detection unit 122 can be configured to detect a region in which a difference between the background image and the captured image is large as a moving object region.

Furthermore, in the following description, for ease of explanation, an example in which the detection unit 122 detects a rectangular person region is described.

The image conversion unit 123 functioning as a background image generation unit, which is implemented by, for example, the control unit 202 executing a program stored in the storage unit 201, generates a background image using the acquired image supplied from the image receiving unit 121 and the detection result supplied from the detection unit 122. The background image is generated by combining regions other than a foreground (for example, a person region) portion from among a plurality of acquired images. In other words, a further background image is generated based on portions of the plurality of captured images which are not detected as a region in which a foreground object such as a person is present. Details of this processing are described below.

The background storing unit 124, which is implemented by, for example, the storage unit 201, stores a background image generated by the image conversion unit 123 or a background image updated by the background updating unit 125, which is described below.

The background updating unit 125, which is implemented by, for example, the control unit 202 executing a program stored in the storage unit 201, updates a background image acquired from the background storing unit 124 with use of the acquired image and detection result respectively supplied from the image receiving unit 121 and the detection unit 122. Furthermore, the background updating unit 125 is able to acquire a background image generated by the image conversion unit 123 without using the acquired image and detection result respectively supplied from the image receiving unit 121 and the detection unit 122. In this case, the background updating unit 125 updates a past background acquired from the background storing unit 124 with use of a new background image acquired from the image conversion unit 123. The background updating unit 125 stores the updated background image in the background storing unit 124. Details of processing performed by the background updating unit 125 are also described below.

The silhouette image generation unit 126, which is implemented by, for example, the control unit 202 executing a program stored in the storage unit 201, generates a silhouette image of a person based on a difference between the background image and the acquired image. Furthermore, the silhouette image generation unit 126 is able to generate a silhouette image of not only a person but also a foreground object, but can be configured to specify a person by, for example, pattern recognition and not to generate a silhouette image with respect to other than persons. The background image and the acquired image are acquired from, for example, the background storing unit 124 and the image receiving unit 121, respectively. Furthermore, the silhouette image generation unit 126 can directly acquire the background image generated or updated by, for example, the image conversion unit 123 or the background updating unit 125 without via the background storing unit 124. Here, the silhouette image is an image obtained by anonymizing an object extracted as a foreground to such a degree that a profile shape thereof is viewable, and the inside of the profile is filled with a color different from that of the background.

Furthermore, the silhouette image generation unit 126 can perform similar anonymization processing as an anonymized image generation unit. For example, the silhouette image generation unit 126 only needs to generate a binary image indicating a region in which to perform mosaic processing, blurring processing, or mask processing.

The output unit 127, which is implemented by, for example, the output unit 205, combines the silhouette image generated by the silhouette image generation unit 126 with the background image updated by the background updating unit 125 into a composite image and then outputs the composite image to any one of display screens (not illustrated) of the display apparatus 102. The output unit 127 can be configured to superimpose a silhouette image on the background image in a see-through manner. Furthermore, in a case where the silhouette image generation unit 126 performs another type of anonymization processing (mosaic processing or blurring processing), the output unit 127 can be configured to perform, based on the acquired image acquired by the image receiving unit 121 and the binary image, mosaic processing or blurring processing on the position indicated by the binary image.

The preliminary background storing unit 128, which is implemented by, for example, the storage unit 201, stores a background image which is used for the detection unit 122 to extract a foreground at the beginning or an image which is used as a background image when the degree of perfection of a background image generated by the image conversion unit 123 is low.

Figure 3A:
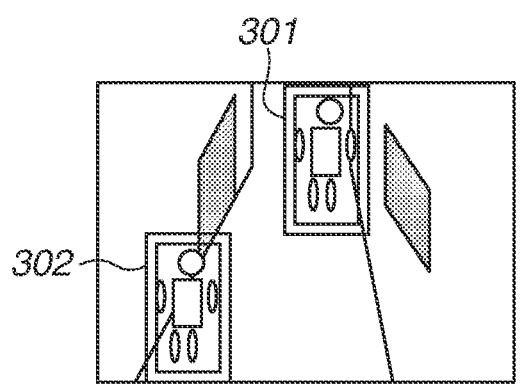
FIGS. 3A, 3B, 3C, and 3D are schematic diagrams illustrating an outline of generation processing for a background image.

Next, generation processing for a background image performed by the image conversion unit 123 is described with reference to FIGS. 3A, 3B, 3C, and 3D. The image conversion unit 123 specifies a region which is not a person from the acquired image based on the detection result output by the detection unit 122, thus generating a background image. FIG. 3A is a diagram illustrating a result of person detection processing performed on the acquired image captured at a given time of day.

Figure 3B:
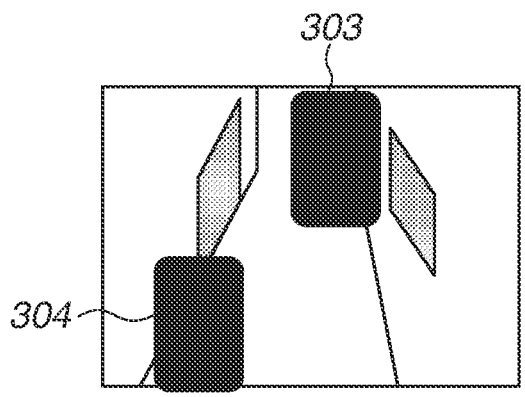

Referring to FIG. 3A, each of rectangular regions 301 and 302 indicates a region in which a person has been detected (a person region). FIG. 3B illustrates a background image generated by employing pixel values of regions other than the person regions in which persons have been detected from the acquired image used to obtain the detection result illustrated in FIG. 3A. Referring to FIG. 3B, in the background image, regions 303 and 304 are person regions and are, therefore, represented as black filled regions in which no pixel values are employed. While, in an image in which no person has been detected, since there are no pixel values that are not employed, one image is able to be used to obtain the pixel values of the entire image, an image in which a person has been detected, if alone, is not able to be used to obtain the pixel values of the entire image, so that there remain regions in which pixel values have not been obtained. Therefore, the image conversion unit 123 in the present exemplary embodiment repeats similar processing using other images captured at different times of day in order that there becomes no region in which pixel values have not been detected from among regions included in the captured image.

Figure 3C:
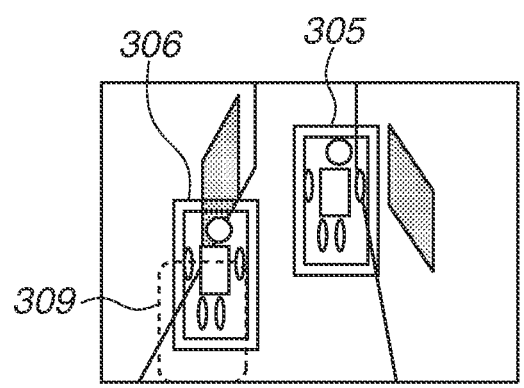
Figure 3D:
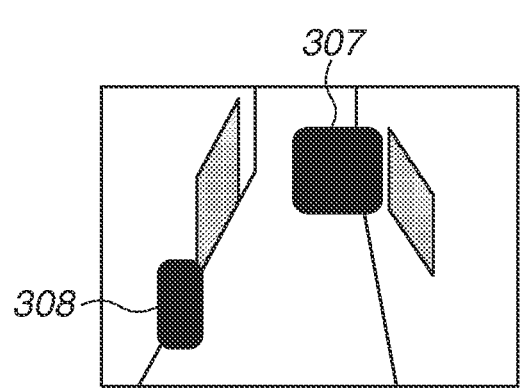

FIG. 3C is a diagram illustrating a result of detection processing performed on the acquired image captured at a time of day different from that of the result illustrated in FIG. 3A, and, referring to FIG. 3C, rectangular regions 305 and 306 are person regions. FIG. 3D illustrates a background image which is obtained by applying pixel values obtained in regions excluding the person regions 305 and 306, which are included in the acquired image used to obtain the detection result illustrated in FIG. 3C, in the regions 303 and 304, in which pixel values have not been obtained in FIG. 3B. In other words, referring to FIG. 3D, in regions 307 and 308, which have been person regions in both the detection result illustrated in FIG. 3A and the detection result illustrated in FIG. 3C, pixel values have still not been obtained even at this point of time, but, in the other regions, pixel values have been obtained. In this way, in the background image illustrated in FIG. 3D, the regions in which pixel values have not been obtained decrease as compared with the background image illustrated in FIG. 3B. The image conversion unit 123 repeatedly performs such processing on a plurality of images, so that the regions in which pixel values have not been obtained gradually decrease.

Furthermore, in a video image in which a person or persons are always present, there is a case where it is impossible to obtain pixel values of the entire image even if increasing the number of images. In this case, a region in which pixel values remain unobtained even after a predetermined number of images are processed is stored in the background storing unit 124 as a background ungenerated region, in which a background image has not been able to be generated. Moreover, the degree of perfection of a background image is calculated from the proportion of a background ungenerated region to the entire image. The degree of perfection refers to the proportion of a partial background image obtained by the image conversion unit 123 to the number of pixels of an ideal background image (the number of pixels of a captured image) (the degree of generation, the rate of generation, or score). For example, in a case where, when one captured image has 10,000,000 pixels, a region having 100,000 pixels is a background ungenerated region, the degree of perfection is calculated to be 99%. The degree of perfection can be simply calculated to be a score of 99. Moreover, the area ratio (%) of an angular field formed by a partial background image to the angular field of a captured image (a pan angle of 180 degrees and a tilt angle of 90 degrees) can be set as the degree of perfection.

Moreover, while it is desirable that pixel values of any one of a plurality of acquired images be used as pixel values of respective regions of a background image, this is not a restriction. For example, pixel values of adjacent regions of a plurality of acquired images or an average value or a frequently appearing value thereof can be used for interpolation as pixel values of a background ungenerated region. Furthermore, the average value used herein is a result obtained by dividing the sum of pixel values about one or more images that are not person regions among a plurality of acquired images by the number of images of such one or more images.

The background updating unit 125 acquires a background image, an acquired image, and a detection result from the background storing unit 124, the image receiving unit 121, and the detection unit 122, respectively. Then, the background updating unit 125 updates a background image by, with respect to regions other than the regions detected as person regions, using, for example, a weighted average value between pixel values of the acquired image and pixel values of the background image as a pixel value of the background image. For example, with respect to a region which is indicated by the detection result not to be a person region, the background updating unit 125 multiplies each pixel value of the background image acquired from the background storing unit 124 by a coefficient α (0<α<1), multiplies each pixel value of the acquired image acquired from the image receiving unit 121 by a coefficient (1−α), and then adds together the multiplied pixel values. At this time, as the coefficient α is larger, pixel values of the background image acquired from the background storing unit 124 have a greater influence, and, as the coefficient α is smaller, pixel values of the acquired image acquired from the image receiving unit 121 have a greater influence.

Moreover, in a case where a background ungenerated region is included in the background image generated by the image conversion unit 123, the background updating unit 125 acquires information about the background ungenerated region from the background storing unit 124. Then, in a case where, among regions corresponding to the background ungenerated region in an acquired image, there is a region that has not been detected as a person region in the acquired image, the background updating unit 125 uses pixel values of such a region as pixel values of the background image.

For example, in a case where the background image generated by the image conversion unit 123 is an image illustrated in FIG. 3B, suppose that the regions 303 and 304 are background ungenerated regions and the image illustrated in FIG. 3C is an acquired image. In this case, for example, a region 309 which does not overlap the region 306 illustrated in FIG. 3C within the region 304 illustrated in FIG. 3B is a region that has not been detected as a person region in the acquired image among regions corresponding to the background ungenerated region in the background image at that point of time in FIG. 3C. Therefore, the background updating unit 125 is able to directly employ pixel values of the region 309 illustrated in FIG. 3C as pixel values of a region corresponding to the region 309 illustrated in FIG. 3C within the region 304 of the background image illustrated in FIG. 3B. The background updating unit 125 performs such processing to treat a region corresponding to the region 309 as a background generated region, thus updating information about the background ungenerated region. This processing enables pixel values of a background ungenerated region to be updated at higher speed than those of a background generated region. Furthermore, while, in the above description, pixel values are updated by weighted average with regard to a background generated region, this is not a restriction. For example, the background updating unit 125 is able to update pixel values with regard to a background generated region using a given method (or a given function) which determines pixel values while referring to both pixel values of a background image and pixel values of an acquired image. Moreover, in a case where the attribute of an object region, such as a person or a car, has been determined, the above-described updating can be performed with use of the region of an object having a specific attribute, such as a person, as a detection result.

<Flow of Processing>

Figure 4:
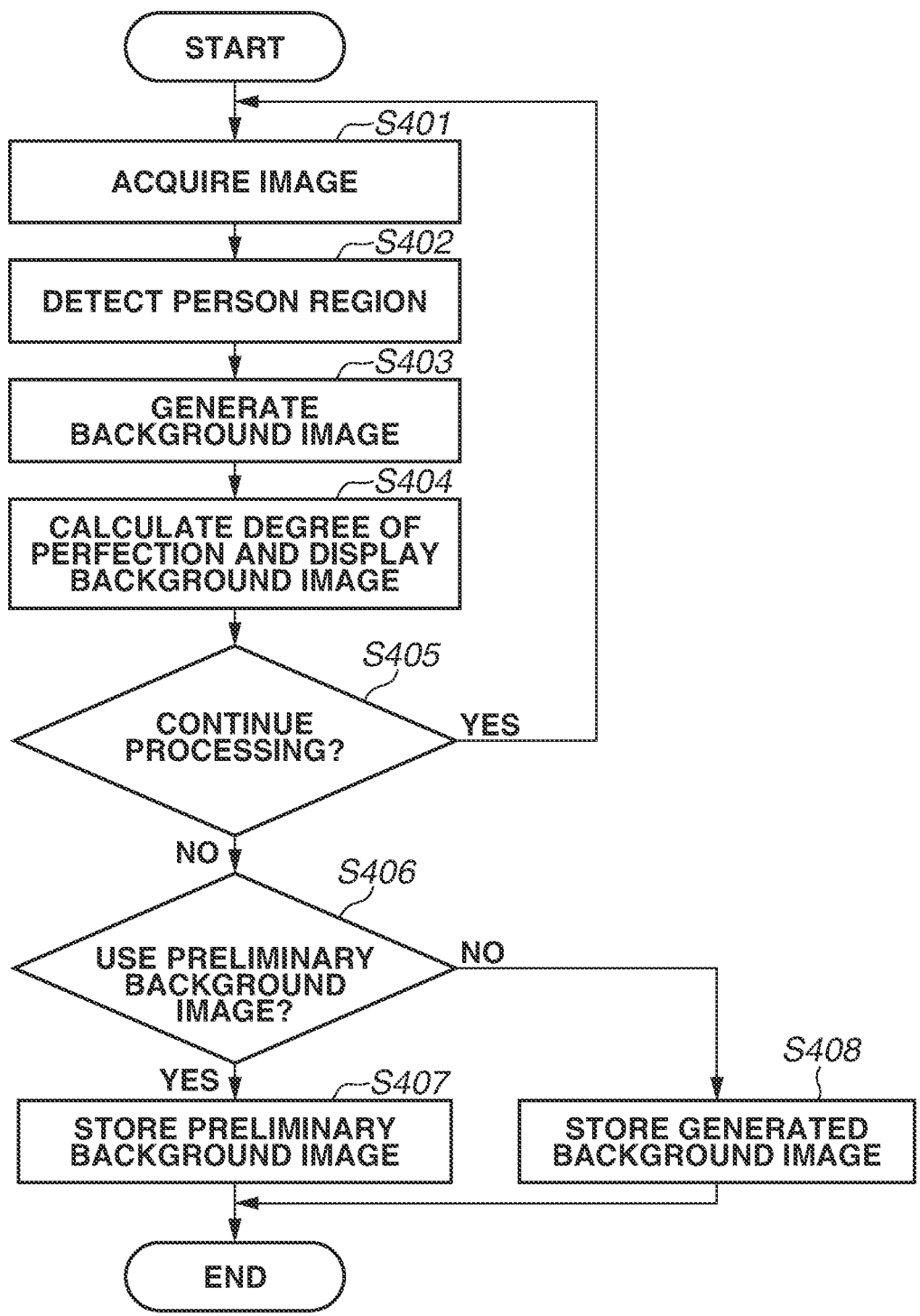
FIG. 4 is a flowchart illustrating the generation processing for a background image.
Figure 5A:
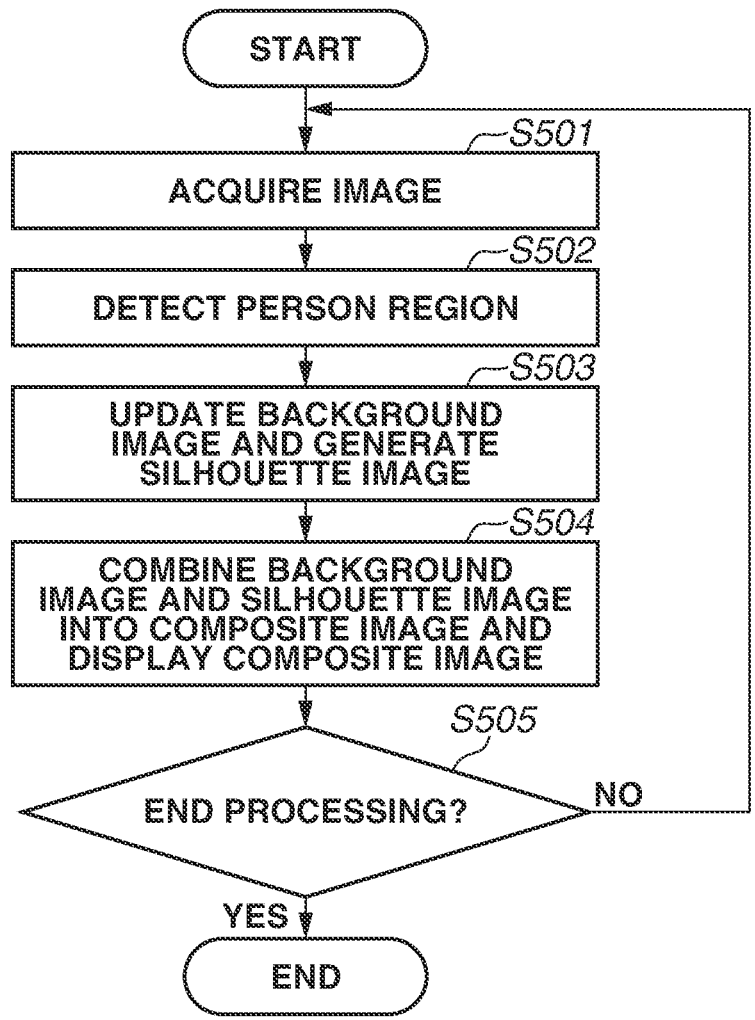
FIG. 5A is a flowchart illustrating generation processing for a privacy protection image.

Next, an example of the flow of processing which is performed by the above-described image processing system is described with reference to FIG. 4 and FIGS. 5A and 5B. In the following description, the display apparatus 102 is assumed to independently perform the processing. FIG. 4 is a flowchart illustrating the flow of processing for generating a background image, and FIG. 5A is a flowchart illustrating the flow of processing for generating and displaying a privacy protection image. In step S401, the display apparatus 102 acquires, via the image receiving unit 121, an image, and, in step S402, detects, via the detection unit 122, a person region included in the image. Next, in step S403, the display apparatus 102 generates, via the image conversion unit 123, a background image, and, in step S404, calculates, via the image conversion unit 123, the degree of perfection of the background image (the proportion of regions of pixels in which a background has been acquired to the entire regions of pixels) and displays, via the output unit 127, the background image on a display screen of the display apparatus 102.

Next, in step S405, the display apparatus 102 determines, via the control unit 202, whether to continue the processing based on the degree of perfection of the background image, the length of time taken to perform the processing, and the number of remaining images, and, if it is determined to continue the processing (YES in step S405), returns the processing to step S401. For example, when the degree of perfection is greater than or equal to a predetermined threshold value, the display apparatus 102 determines to end the processing. For example, when the elapsed time from the start of generation processing for a background image has exceeded a predetermined time, the display apparatus 102 determines to end the processing. Besides, when the acquired image is recorded image data or still image data, the number of images is limited, and there has become no remaining processing target image, the display apparatus 102 determines to end the processing.

Next, in step S406, the display apparatus 102 determines, via the control unit 202, whether to use a preliminary background image based on the degree of perfection of the background image, and, if it is determined to use a preliminary background image (YES in step S406), then in step S407, stores, via the control unit 202, the preliminary background image in the background storing unit 124. For example, when the degree of perfection falls below the predetermined threshold value, the display apparatus 102 determines to use a preliminary background image. With this, in a case where the degree of perfection of a background image generated when there are a restriction on the processing time and a restriction on the number of images does not become greater than or equal to the threshold value, the display apparatus 102 uses the preliminary background image, thus being able to use a more appropriate background image while avoiding a background image the degree of perfection of which is low.

On the other hand, if it is determined not to use a preliminary background image (NO in step S406), then in step S408, the display apparatus 102 stores, via the control unit 202, the generated background image in the background storing unit 124. For example, when the degree of perfection is greater than or equal to the predetermined threshold value, the display apparatus 102 determines, via the control unit 202, not to use a preliminary background image. This causes a plurality of images to be combined with use of pixel values of regions excluding regions of persons (foreground objects), thus generating an appropriate background image.

In processing for generating and displaying a privacy protection image, in step S501, the display apparatus 102 acquires, via the image receiving unit 121, an image, and, in step S502, detects, via the detection unit 122, a person. Next, in step S503, the display apparatus 102 updates, via the background updating unit 125, a background image and generates, via the silhouette image generation unit 126, a silhouette image to obscure the foreground object (person) detected by the detection unit 122. The silhouette image can be, for example, a one-colored image in the shape of a person obtained by filling the region of a person detected by the detection unit 122 with one color. Moreover, an image obtained as a result of image processing in which, for example, predetermined filter processing is applied to a person region so as to make it impossible to identify a person can be used as the silhouette image.

Moreover, an image which is available to find that there is a person but which is not available to identify an individual can be separately prepared and such an image can be used as a silhouette image. In other words, a silhouette image is an image which can be used to obscure (or conceal) the foreground object to an extent that specific features or details of the foreground object can no longer be recognized. After generating a silhouette image, in step S504, the display apparatus 102 combines, via the output unit 127, the silhouette image and the background image into a composite image, and displays, via the output unit 127, the composite image on a display screen of the display apparatus 102. Then, in step S505, the display apparatus 102 determines whether to end the processing, and, if it is determined not to end the processing (NO in step S505), the display apparatus 102 returns the processing to step S501.

Figure 5B:
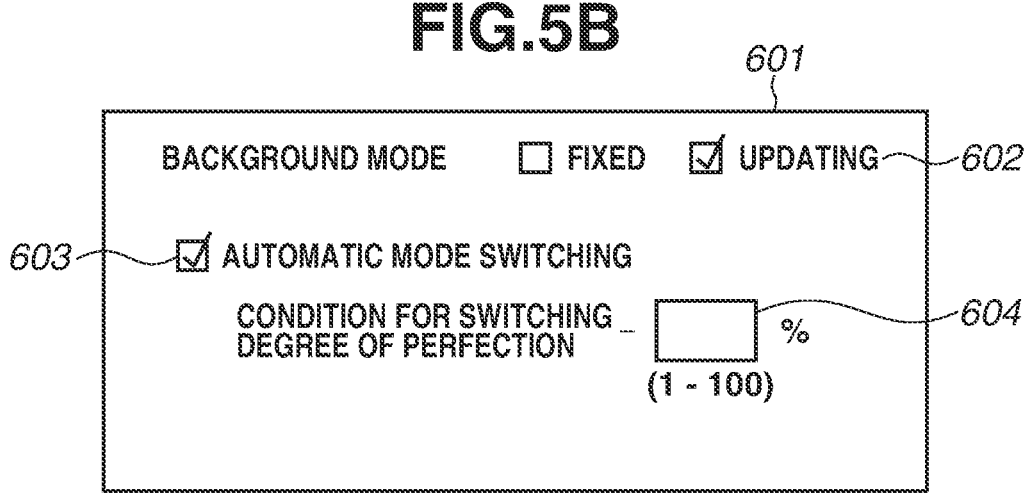
FIG. 5B is a diagram illustrating an example of a user interface.

FIG. 5B illustrates a user interface used for the user to set, for example, a mode for updating a background. A window 601 is displayed on a display screen of the display apparatus 102. Checkboxes 602 for selecting a background mode can be used to set any one of a fixed mode, in which a fixed background image (preliminary background image) continues to be always used, and an updating mode, in which a background image is generated by combining a plurality of partial images excluding person regions, which can be a mode for combining portions other than a foreground of each frame of moving image data. A checkbox 603, which is able to be selected when the updating mode is selected, is a checkbox for setting temporarily switching to the fixed mode until, if the degree of perfection of a background image is less than a predetermined degree of perfection, the predetermined degree of perfection is reached. When any of the checkboxes 602 is not selected, the checkbox 603 is grayed out in such a way as not to be selected. Moreover, a setting box 604 is a box for setting a condition for switching modes, and, when the checkbox 603 is not selected, the setting box 604 is grayed out in such a way as not to allow entry of a numerical value. The setting box 604 allows setting of an integer number of 1 to 100, and, if any other value is entered, an error is returned. Furthermore, a configuration in which targets which are excluded from targets for generating a background image (a person, a moving object, a specific object, and an object having a specific attribute) are able to be set can be employed. Furthermore, in a case where a fixed background is to be used, a thumbnail image thereof can be displayed in the window 601. Moreover, whether to use the fixed mode or the updating mode via the user interface illustrated in FIG. 5B can be collectively set with respect to a plurality of imaging apparatuses 101. However, in a case where the fixed mode is collectively set, since background images to be used for the fixed mode are required to correspond to the respective imaging apparatuses 101, reflection processing for the background images is configured not to be performed.

As described above, since a plurality of images captured by the image recording apparatus 101 are combined without the region of a foreground such as a person being used for generation of a background image, not only a background image used to generate a privacy protection image can be appropriately generated, but also, in a case where the degree of perfection does not become greater than or equal to a threshold value due to a restriction of a required time or the number of images, a preliminary background image can be used to set an appropriate image.

Furthermore, in the above-described exemplary embodiment, the image conversion unit 123 or the background updating unit 125 combines partial regions other than person regions, but can be configured to combine partial images other than moving object regions to generate or update a background image. Moreover, the image conversion unit 123 or the background updating unit 125 can be configured to combine partial images which are neither person regions nor moving object regions.

Moreover, while, in the above-described exemplary embodiment, a fixed image is used as a preliminary background image, the preliminary background image can be replaced by a background image the degree of perfection of which has reached a threshold value (100%) as a result of partial images being combined. While, in the description of the above-described exemplary embodiment, a preliminary background image is used based on the degree of perfection, whether to use a preliminary background image can be determined based on the number of pixels of a simply combined background image.

Furthermore, in the above-described exemplary embodiment, detection of a foreground, generation of a background image, and retention of a preliminary background image are performed by the display apparatus 102, but can be performed by the imaging apparatus 101.

The present invention can also be implemented by processing for supplying a program for implementing one or more functions of the above-described exemplary embodiment to a system or apparatus via a network or a storage medium and causing one or more processors included in a computer of the system or apparatus to read out and execute the program. Moreover, the present invention can also be implemented by a circuit for implementing one or more functions (for example, an application specific integrated circuit (ASIC)).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-014188 filed Jan. 30, 2018, which is hereby incorporated by reference herein in its entirety.

What is claimed is:

1. An image processing apparatus comprising:
    a hardware processor; and
    a memory for storing instructions to be executed by the hardware processor, wherein, when the instructions stored in the memory are executed by the hardware processor, the image processing apparatus functions as:
    a detection unit configured to detect a first region in which a foreground object is present with respect to a plurality of captured images;
    a holding unit configured to hold a first background image;
    a generation unit configured to generate a second background image based on portions of each of the plurality of captured images which are not detected as a first region; and
    an output unit configured to select one of the first background image and the second background image based on a proportion of a number of pixels of the second background image to a number of pixels of the captured image, and configured to output, based on the selected background image and the first region, an image in which the foreground object is obscured.

2. The image processing apparatus according to claim 1, wherein the detection unit is configured to detect an object having a predetermined attribute as the foreground object.

3. The image processing apparatus according to claim 1, wherein the detection unit is configured to detect a foreground object included in the plurality of captured images based on the first background image.

4. The image processing apparatus according to claim 1, wherein the first region is defined as a rectangular region which includes the foreground object.

5. The image processing apparatus according to claim 1,
    wherein the detection unit is configured to detect the first region in each of a first captured image and a second captured image, and
    wherein the generation unit is configured to generate the second background image using, with respect to a second region in which the first region of the first captured image and the first region of the second captured image overlap, pixel values of a region corresponding to the second region included in the second captured image.

6. The image processing apparatus according to claim 1,
    wherein the detection unit is configured to detect a first region in each of a first captured image and a second captured image, and
    wherein the generation unit is configured to generate the second background image based on, with respect to a second region in which the first region of the first captured image and the first region of the second captured image overlap, both pixel values of a region corresponding to the second region included in the first captured image and pixel values of a region corresponding to the second region included in the second captured image.

7. The image processing apparatus according to claim 1, wherein the generation unit is configured to determine whether to use a further captured image for composite generation of the second background image based on, with respect to the second background image generated based on the plurality of images, a score determined based on a proportion of a region in which pixel values are not acquired from the plurality of images.

8. The image processing apparatus according to claim 1, wherein the generation unit is configured to update the generated second background image with use of a newly captured image.

9. The image processing apparatus according to claim 1, further comprising an acquisition unit configured to acquire the plurality of captured images.

10. An image processing method comprising:
   detecting a first region in which a foreground object is present with respect to a plurality of captured images;
   holding a first background image;
   generating a second background image based on portions of each of the plurality of captured images which are not detected as a first region; and
   selecting one of the first background image and the second background image based on a proportion of a number of pixels of the second background image to a number of pixels of the captured image, and outputting, based on the selected background image and the detected first region, an image in which the foreground object is obscured.

11. A non-transitory computer-readable storage medium storing computer-executable instructions that, when executed by a computer, cause the computer to perform a method comprising:
   detecting a first region in which a foreground object is present with respect to a plurality of captured images;
   holding a first background image;
   generating a second background image based on portions of each of the plurality of captured images which are not detected as a first region; and
   selecting one of the first background image and the second background image based on a proportion of a number of pixels of the second background image to a number of pixels of the captured image, and outputting, based on the selected background image and the detected first region, an image in which the foreground object is obscured.

12. An image processing apparatus comprising:
   a hardware processor; and
   a memory for storing instructions to be executed by the hardware processor, wherein, when the instructions stored in the memory are executed by the hardware processor, the image processing apparatus functions as:
   a detection unit configured to detect a first region in which a foreground object is present with respect to a plurality of captured images;
   a holding unit configured to hold a first background image;
   a generation unit configured to generate a second background image based on portions of each of the plurality of captured images which are not detected as a first region; and
   an output unit configured to select one of the first background image and the second background image based on an area ratio of the second background image to an angular field of the captured image, and configured to output, based on the selected background image and the first region, an image in which the foreground object is obscured.

* * * * *